Patented Oct. 11, 1927.　　　　　　　　　　　　　　　　　　　1,644,880

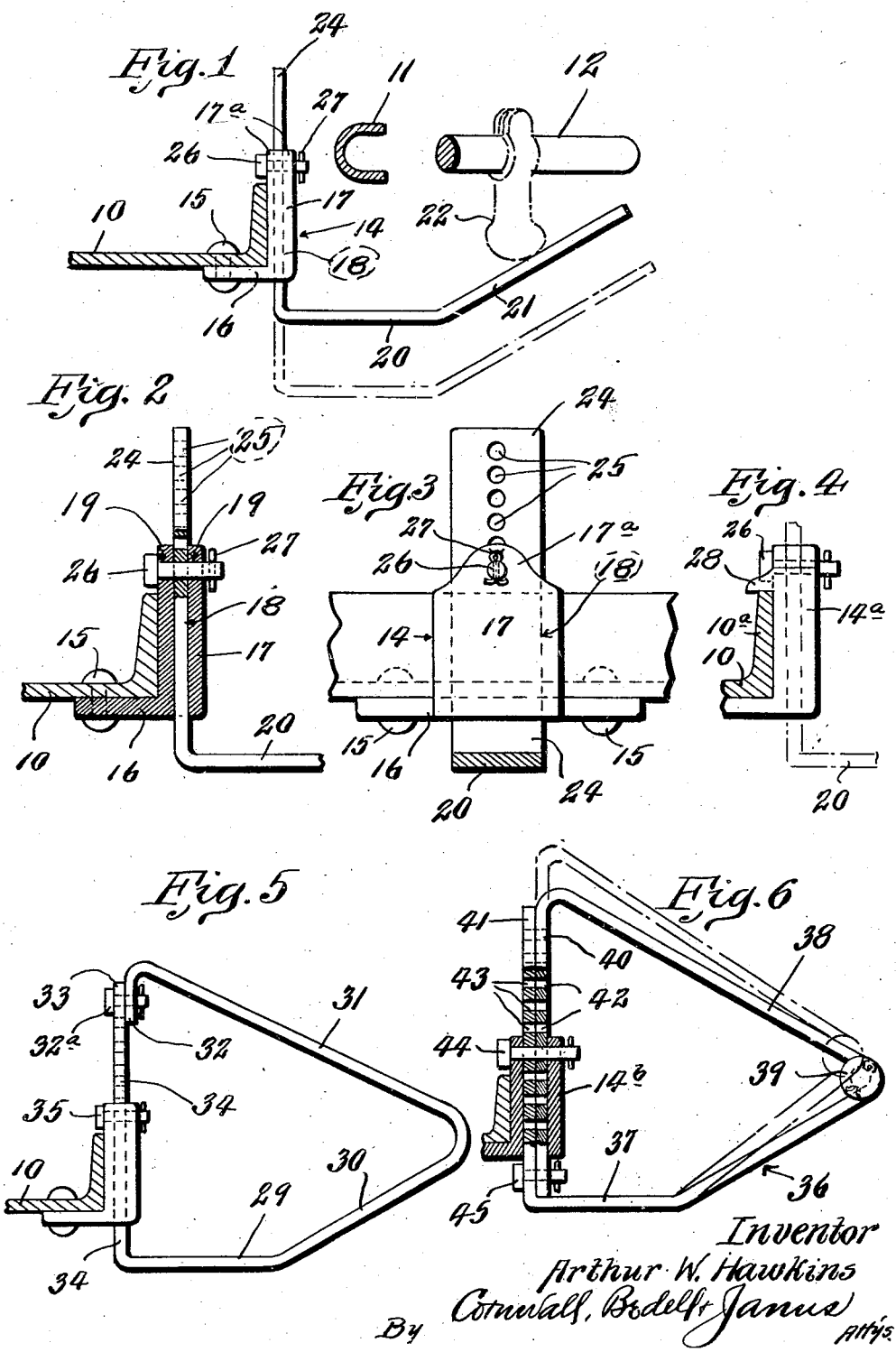

UNITED STATES PATENT OFFICE.

ARTHUR W. HAWKINS, OF MUSKEGON, MICHIGAN, ASSIGNOR TO CHICAGO RAILWAY EQUIPMENT COMPANY, OF CHICAGO, ILLINOIS, A CORPORATION OF ILLINOIS.

BRAKE-BEAM-SUPPORTING MEANS.

Application filed August 21, 1925. Serial No. 51,695.

This invention relates to new and useful improvements in adjustable brake beam supporting means, the objects being to provide a brake beam supporting means carried by a fixed part of a car truck and adjustable relative thereto in a vertical plane.

Further objects of the invention are to provide a simple mounting adapted to be fixed to a spring plank and arranged to adjustably receive a brake beam supporting means whereby the latter may be adjusted with respect to the brake beam with which it is associated.

With these and other objects in view, my invention consists in certain novel features of construction and arrangement of parts, hereinafter more fully described and claimed, and illustrated in the accompanying drawings, in which—

Figure 1 is a side elevational view of the brake supporting means and mounting therefor.

Figure 2 is a vertical cross section through the mounting, showing means of attachment of the brake beam supporting means thereto.

Figure 3 is a front elevational view of the mounting with the brake beam supporting means attached thereto.

Figure 4 is a detail view of a modified form of mounting.

Figures 5 and 6 are side elevational views showing modified forms of the brake supporting means.

Referring by numerals to the accompanying drawings, 10 indicates a car truck part, such as a spring plank, 11 the compression member of a brake beam, and 12 the tension member thereof. A mounting 14 is secured in position on the spring plank by means of rivets 15 which secure the horizontal portion 16 of said mounting to the web portion of the spring plank. The vertical portion 17 of said mounting is provided with a vertically disposed slot or pocket 18, said vertical portion extending upwardly adjacent to the side of the spring plank and terminating in extensions 17ª provided in their walls with aligned apertures 19.

A brake beam supporting means 20 is provided with a track portion 21 extending under the brake beam and adapted to support the tension member or a chair carried thereby, such as indicated in dotted lines at 22. Said supporting means is further provided with a vertical portion 24 adapted to pass through the vertically disposed slot 18 of mounting 14. This vertical portion 24 is provided with a vertically disposed row of apertures 25, any one of which is adapted to be aligned with the apertures 19. A bolt or pin 26 is adapted to be seated in apertures 19 and pass through one of the apertures 25, thereby interlocking the brake beam supporting means with the mounting. A cotter pin 27 can be used to prevent displacement of the pin 26. In this manner, support 20 may be adjusted in a vertical plane by bringing the proper aperture 25 in alignment with apertures 19.

In the form shown in Figure 4, the vertical portion 17ª of mounting 14ª is provided at its upper end with outwardly projecting lugs 28 which are adapted to rest on the upwardly presented edge of the vertically disposed flange 10ª of spring plank 10. Thus the weight or the stresses to which said mounting is subjected is partially taken care of by lugs 28 which rest on the upwardly presented flange of the spring plank, thereby relieving the horizontal portion of the mounting from undue strains.

In the modified form shown in Figure 5, a brake beam support 29 is provided with a track portion 30 which extends under the brake beam and has a rebent portion 31 which extends rearwardly above the brake beam and terminates in a vertically and downwardly disposed end 32 which is apertured and adapted to be attached by attaching means 32ª to the end 33 of a vertically disposed portion 34 which latter passes through the pocket formed in the mounting. This portion 34 is provided with a vertically disposed row of horizontal apertures, any one of which is adapted to receive a pin 35 horizontally seated in the upper end of said mounting. In this manner, vertical adjustment is provided for the support by bringing any one of said apertures in engagement with pin 35 and a further adjustment is provided by bringing the apertured end 32 into engagement with any one of the apertures of the vertically disposed portion 34.

In the modified form shown in Figure 6, a brake beam support 36 is shown consisting of two members, a lower or track member 37 which extends under the brake beam, and an upper member 38, one end of which is hinged to the outer end of member 38 as indicated at 39 and the other end of which is bent downwardly to form a vertically disposed leg 40 and extends through the slot in the mounting 14ᵇ. Member 37 is provided with a vertically and upwardly presented leg 41 which extends upwardly through the slot in mounting 14ᵇ adjacent to the downwardly presented leg 40. The legs or extensions 40 and 41 are provided with horizontal apertures 42 and 43, respectively, which are arranged in vertical rows and are adapted to be brought into alignment with each other for receiving a pin 44 which is seated in the coinciding apertures formed in the walls of mounting 14ᵇ. If desired, a pin 45 can be used to secure the two vertical extensions 40 and 41 together independently of pin 44 in order to preserve the relative positions of members 37 and 38 when pin 44 is withdrawn and serve as auxiliary means to prevent the displacement of said members from the mounting. By adjusting legs 40 and 41 relative to each other, the angularity of the track portion 37ᵃ of member 37 can be varied at will.

I claim:

1. An adjustable brake beam support comprising a mounting adapted to be fixed to a spring plank and having a vertically disposed recess, and a support member provided with a track portion for engaging a brake beam and having a vertically disposed portion seated in said recess and adjustable therein to vary the position of said track member in a vertical plane.

2. An adjustable brake beam support comprising a mounting adapted to be secured to a car truck part, said mounting being provided with a vertically disposed seat, and a brake beam support member having an upward extension adjustably disposed in said seat for adjusting the brake beam engaging portion thereof in a vertical plane.

3. An adjustable brake beam support comprising a mounting adapted to be secured to a car truck part, said mounting being provided with a vertically disposed seat, a brake beam support member having a vertically disposed extension adjustably disposed in said seat for adjusting the brake beam engaging portion thereof relative to a brake beam, and means for interlocking said support with the extension of said mounting.

4. An adjustable brake beam support comprising a mounting adapted to be secured to a car truck part, said mounting being provided with a vertically disposed pocket open at top and bottom, a brake beam support member having a vertically disposed portion adjustably disposed in said pocket for adjusting the brake beam engaging portion thereof relative to a brake beam, and removable means for locking said support in adjusted position in said seat.

5. An adjustable brake beam support comprising a mounting adapted to be secured to a car truck part and provided with a vertically disposed seat, a brake beam supporting member having a track portion extending under the brake beam and a vertically disposed portion extending through said seat, said vertically disposed portion being provided with a series of apertures arranged in a vertical row, and a member seated in said mounting and adapted to engage any one of said apertures and lock said brake beam support in position in said mounting.

6. In a brake beam support, the combination of a spring plank, with a mounting disposed to one side thereof and provided with a vertically disposed pocket, a brake beam supporting track member having an upwardly disposed portion insertable through and adjustable in said pocket, and means interengaging said upward portion with the walls of said pocket for locking said track member in adjusted position.

7. In a brake beam support, the combination with a spring plank, of a mounting disposed adjacent to one side thereof and secured thereto, said mounting being provided with a vertically disposed slot, a pair of coinciding apertures formed in the walls of said mounting, a brake beam support member having a track portion extending under a brake beam and a vertically disposed portion traversing said slot, said vertically disposed portion being provided with a series of apertures disposed in a vertical row, and a pin removably seated in the apertures of the mounting and adapted to engage any one of the apertures in said vertically disposed portion for adjustably supporting said brake beam support member.

8. In a brake beam support, the combination with a car truck part, of a mounting disposed adjacent thereto and provided with a vertically disposed pocket, a support member provided with a track portion adapted to be engaged by a brake beam part and having a vertically and upwardly disposed portion extending through and adjustably arranged in said pocket, and means carried by said mounting and engaging said vertical portion for locking said support member in position therein.

9. A brake beam support comprising a mounting provided with a vertically disposed pocket open at top and bottom, a loop support member having a vertically disposed portion extending through said pocket, and means for adjustably locking said vertically disposed portion in said slot.

10. A brake beam support comprising a mounting adapted to be secured to a car truck part and provided with a vertically disposed slot, a loop support member for supporting a brake beam and having a vertically disposed portion extending through said slot, means for adjustably locking said vertically disposed portion in said slot, and means for locking the ends of said loop together.

11. An adjustable brake beam support comprising a mounting adapted to be secured to a car truck part and provided with a vertically disposed slot, and a loop support member adapted to engage a brake beam and having a vertically disposed portion extending through said slot and adjustably secured therein, and means for locking the ends of said loop member together, said ends being adjustable relative to each other to vary the inclination of the brake beam engaging portion of said loop member.

12. A brake beam support comprising a mounting adapted to be carried by a car truck part and having a vertically disposed pocket, and a track member having a vertically disposed leg surrounded by said pocket and vertically adjustable therein.

13. In a brake beam support, a bracket for attachment to a truck spring plank and adapted to provide a vertically extending recess adjacent to the edge of said spring plank, and a beam supporting element having an upright leg adjustable vertically in said seat, and having an outwardly extending leg for engaging the underside of a brake beam member.

In testimony whereof I hereunto affix my signature this 17th day of August, 1925.

ARTHUR W. HAWKINS.